(12) United States Patent
Boisclair

(10) Patent No.: US 9,929,547 B2
(45) Date of Patent: Mar. 27, 2018

(54) ANGLE BLOCK APPARATUS AND METHODS OF USING THEREOF

(71) Applicant: Marmon Utility, LLC, Milford, NH (US)

(72) Inventor: Brian Boisclair, Goffstown, NH (US)

(73) Assignee: Marmon Utility, LLC, Milford, NH (US)

( * ) Notice: Subject to any disclaimer, the term of this patent is extended or adjusted under 35 U.S.C. 154(b) by 12 days.

(21) Appl. No.: 15/006,492

(22) Filed: Jan. 26, 2016

(65) Prior Publication Data

US 2016/0141848 A1 May 19, 2016

Related U.S. Application Data (63) Continuation of application No. 13/768,521, filed on Feb. 15, 2013, now Pat. No. 9,279,519.

(60) Provisional application No. 61/601,783, filed on Feb. 22, 2012.

(51) Int. Cl.
*H02G 1/04* (2006.01)
*F16L 3/08* (2006.01)
*H02G 1/00* (2006.01)

(52) U.S. Cl.
CPC .............. *H02G 1/04* (2013.01); *F16L 3/08* (2013.01); *H02G 1/00* (2013.01)

(58) Field of Classification Search
CPC .... F16L 3/08; H02G 1/00; H02G 1/04; H02G 7/05; H02G 7/053; H02G 7/20; H02G 7/205; H02G 1/02; B61B 12/007; B61B 12/0026; B66D 3/04; B66D 3/06; B66D 2700/026; B66D 2700/028

See application file for complete search history.

(56) References Cited

U.S. PATENT DOCUMENTS

| | | | |
|---|---|---|---|
| 2,174,429 A | 9/1939 | Taylor | |
| 2,188,715 A | 1/1940 | Ingram | |
| 2,202,184 A * | 5/1940 | Berger | B66D 3/046 |
| | | | 254/134.3 PA |

(Continued)

FOREIGN PATENT DOCUMENTS

| | | |
|---|---|---|
| JP | 09027224 A | 1/1997 |
| JP | 09271122 A | 10/1997 |

(Continued)

*Primary Examiner* — Christopher M Koehler
*Assistant Examiner* — Joel Crandall
(74) *Attorney, Agent, or Firm* — Hayes Soloway PC (57) ABSTRACT

An angle block apparatus and method of stringing cable is provided. The apparatus includes an angle block frame having an enclosed frame perimeter structure. A rotatable roller wheel is connected to the angle block frame and positioned interior of the enclosed frame perimeter structure. A connector is affixed to the angle block frame and sized to retain the angle block frame in a substantially stationary position. The method of stringing cable includes, in part, disconnecting a sled carrying the cable from a messenger wire trolley. The sled and cable attached thereto is then moved through the angle block frame from a first side to a second side of the angle block frame. The trolley is moved from the first side to the second side of the angle block frame without going through the angle block frame. The sled is then reattached to the messenger wire trolley on the second side.

20 Claims, 7 Drawing Sheets

(56) References Cited

U.S. PATENT DOCUMENTS

| | | | |
|---|---|---|---|
| 2,202,194 A | | 5/1940 | Berger |
| 2,772,857 A | * | 12/1956 | Bush .................. B66D 3/04 |
| | | | 254/413 |
| 2,924,640 A | | 2/1960 | Barton |
| 3,042,378 A | * | 7/1962 | Preston .................. B66D 3/04 |
| | | | 254/390 |
| 3,098,638 A | | 7/1963 | McAuley |
| 3,199,840 A | | 8/1965 | Lindsey |
| 3,853,304 A | | 12/1974 | Jackson |
| 3,871,621 A | | 3/1975 | Jackson |
| 4,421,301 A | | 12/1983 | Chapman |
| 4,475,715 A | | 10/1984 | Asplin, Sr. |
| 4,498,651 A | | 2/1985 | Allen |
| 4,690,381 A | | 9/1987 | Asai |
| 4,907,782 A | | 3/1990 | Hoekstra |
| 5,064,172 A | | 11/1991 | Hereford |
| 5,573,226 A | | 11/1996 | Smith |
| 5,941,507 A | | 8/1999 | Page |
| 6,129,340 A | * | 10/2000 | Daniel .................. H02G 1/02 |
| | | | 254/134.3 PA |
| 6,201,184 B1 | | 3/2001 | Francois et al. |
| 6,315,270 B1 | | 11/2001 | Fallon |
| 6,375,163 B1 | | 4/2002 | Carlson et al. |
| 7,323,636 B1 | | 1/2008 | Borges et al. |
| 2010/0276172 A1 | | 11/2010 | Frenkel |

FOREIGN PATENT DOCUMENTS

| | | | |
|---|---|---|---|
| JP | 10322827 A | 12/1998 | |
| JP | 2000228808 A | 8/2000 | |

* cited by examiner

ANGLE BLOCK APPARATUS AND METHODS OF USING THEREOF

CROSS REFERENCE TO RELATED APPLICATION

This application claims benefit of U.S. Provisional Application Ser. No. 61/601,783, entitled, "Angle Block Apparatus and Methods of Using Thereof" filed Feb. 22, 2012, and is a continuation of U.S. application Ser. No. 13/768,521, entitled, "Angle Block Apparatus and Methods of Using Thereof" filed Feb. 15, 2013, the entire disclosure of which is incorporated herein by reference.

FIELD OF THE DISCLOSURE

The present disclosure is generally related to overhead transmission and distribution systems and more particularly is related to an angle block apparatus and method of using thereof for use with overhead transmission and distribution systems.

BACKGROUND OF THE DISCLOSURE

Overhead conductor cables are commonly suspended from a messenger wire. The messenger wire is supported on poles or towers with the conductor cable spacers arranged at spaced intervals along the messenger wire to suspend one or more conductor cables. A variety of devices may run along the messenger wire to carry the cables during their installation. However, conventional installation processes are often tedious and expensive since they require the use of numerous different installation devices, and then an exchanging of the installation devices for permanent retention devices. For example, a utility worker installing a cable will have to first install the installation devices, then string the cable through the installation devices, and then go back to each of the installation devices and replace it with a permanent retention device. Additional steps such as tensioning the cable or placing the cable in a permanent block or fixture may be needed as well.

The use of these many installation and permanent retention components comes at a high cost to utility companies. These costs, coupled with the expense in man hours for installation of the cable adds significant costs to the operational budgets of the utility companies, which is passed along to the consumer in the form of higher utility bills. Furthermore, many of the cable retention devices conventionally used are designed for particular or specific uses, and may not be able to be used in universal positions. Thus, a worker must first make sure he or she has the correct device prior to installation. This adds additional complications to the installation process of cable, which adds more time and costs to the already high expense associated with stringing and retaining cable.

Thus, a heretofore unaddressed need exists in the industry to address the aforementioned deficiencies and inadequacies.

SUMMARY OF THE DISCLOSURE

Embodiments of the present disclosure provide an angle block apparatus for overhead transmission and distribution systems and related methods. Briefly described, in architecture, one embodiment of the apparatus, among others, can be implemented as follows. The angle block apparatus includes an angle block frame having an enclosed frame perimeter structure. At least one roller wheel is connected to the angle block frame and positioned interior of the enclosed frame perimeter structure, wherein the at least one roller wheel is rotatable about an axis. A connector is affixed to the angle block frame and sized to retain the angle block frame in a substantially stationary position.

The present disclosure can also be viewed as providing methods of stringing cable through an angle block apparatus. In this regard, one embodiment of such a method, among others, can be broadly summarized by the following steps: stringing at least one cable along a first path, wherein the cable is affixed to a sled and the sled is removably affixed to a trolley carried on a messenger wire, wherein the messenger wire is positioned above the first path; disconnecting the sled from the trolley at a first side of an angle block frame; moving the sled with cable affixed thereto from the first side of the angle block frame, through an enclosed frame perimeter structure of the angle block frame and to a second side of the angle block frame; moving the trolley from the first side of the angle block frame to the second side of the angle block frame without moving the trolley through the angle block frame; and reaffixing the sled with the cable affixed thereto to the trolley on the second side of the angle block frame.

The present disclosure can also be viewed as providing methods of stringing and retaining cable on a utility pole. In this regard, one embodiment of such a method, among others, can be broadly summarized by the following steps: stringing at least one cable along a first path, wherein the cable is affixed to a sled and the sled is removably affixed to a trolley carried on a messenger wire, wherein the messenger wire is positioned above the first path; disconnecting the sled from the trolley at a first side of an angle block frame; moving the sled with cable affixed thereto from the first side of the angle block frame, through an enclosed frame perimeter structure of the angle block frame and to a second side of the angle block frame; guiding the cable through the enclosed frame perimeter structure with at least one roller wheel; moving the trolley from the first side of the angle block frame to the second side of the angle block frame without moving the trolley through the angle block frame; and affixing an end of the cable to a substantially permanent fixture on the second side of the angle block frame, wherein the portion of the cable interior of the enclosed frame perimeter structure contacts the at least one roller wheel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
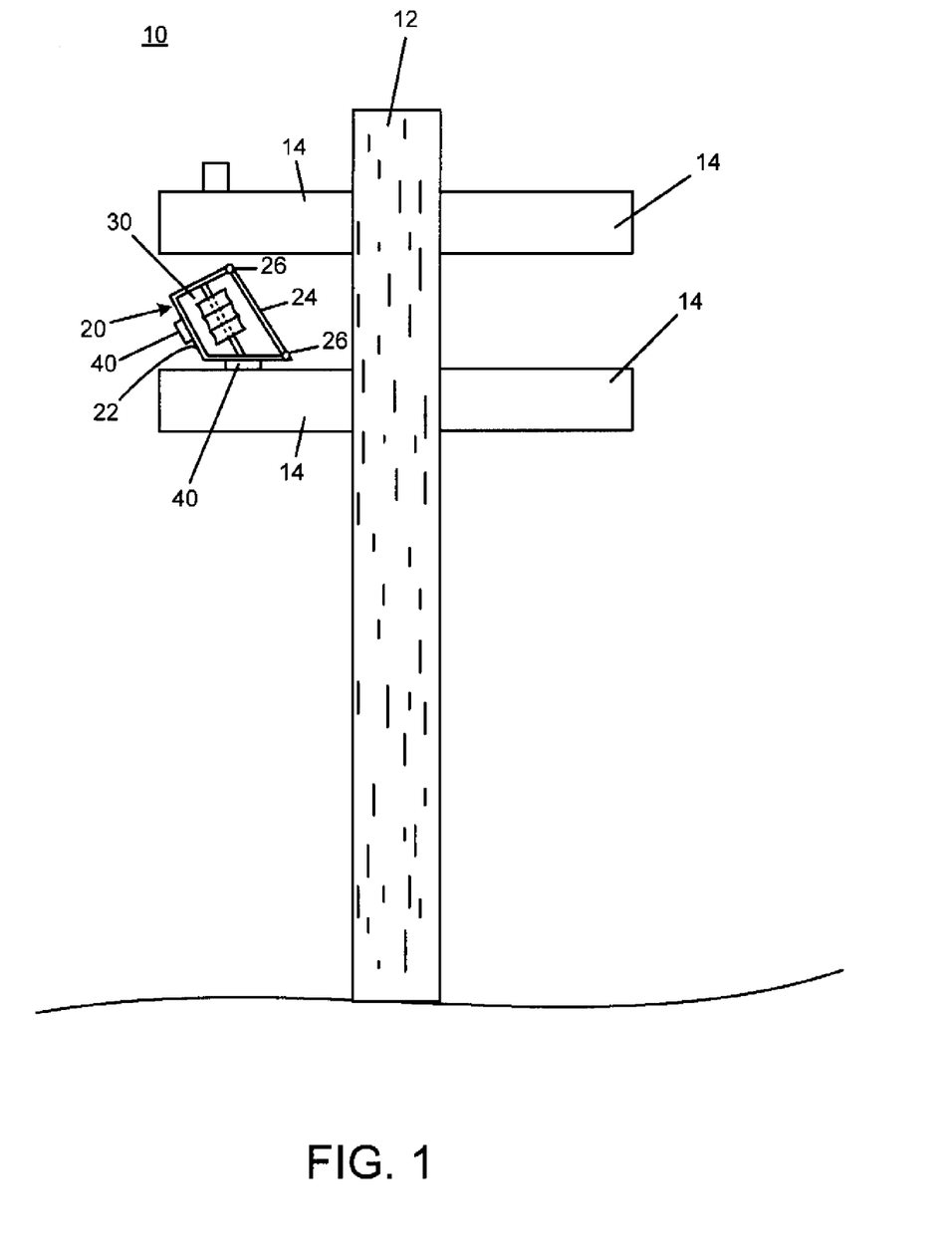
FIG. 1 is front view illustration of an angled block apparatus positioned on a utility pole, in accordance with a first exemplary embodiment of the present disclosure.

FIG. 1 is a front view illustration of an angled block apparatus 10 positioned on a utility pole, in accordance with a first exemplary embodiment of the present disclosure. The angle block apparatus 10, referred to herein simply as 'angle block' and/or 'apparatus,' is used with overhead transmission and distribution systems, such as those used for supporting electrical conductor cables and communication lines. The apparatus 10 includes an angle block frame 20 having an enclosed frame perimeter structure 22. At least one wheel 30 is connected to the angle block frame 20 and is positioned interior of the enclosed frame perimeter structure 22. The wheel 30 is rotatable about an axis. A connector 40 is affixed to the angle block frame 20 and sized to retain the angle block frame 20 in a substantially stationary position, such as on the support bracket 14 of a utility pole 12, as is shown in FIG. 1.

The apparatus 10 is used with stringing and retaining a cable commonly used with utility transmission and distribution of electricity. The apparatus 10 is used in conjunction with the cables or wire, which may be known in the industry as a messenger cable or a catenary, and may be a durable wire structure that is used to support cable, such as a conductor cable, distribution cable, or transmission cables. The apparatus 10 may be used during the installation of the cable As is shown in FIG. 1, the angle block frame 20 has the enclosed frame perimeter structure 22 that is positioned exterior of the wheels 30. The enclosed frame perimeter structure 22 may be characterized as a structure without breaks in the perimeter, such that it defines an interior area location interior of the structure, and an exterior area located exterior to the structure. In FIG. 1, the wheels 30 are located within the interior area of the enclosed frame perimeter structure 22, whereas the connectors 40 are located within an exterior area of the enclosed frame perimeter structure 22. The enclosed frame perimeter structure 22 may be free from openings or other breaks in the structure of the enclosed frame perimeter structure 22, or the enclosed frame perimeter structure 22 may include disconnectable or removable sections, such as a portion of the enclosed frame perimeter structure 22 that opens or comes off.

The angle block frame 20 may be constructed from any type of material, such as galvanized steel, aluminum, plastics, or other materials, or combinations thereof. The angle block frame 20 may be used for installation of a cable and temporary retention of a cable on the utility pole 12 during an installation process. The material that the angle block frame 20 is constructed from should preferably be resistant to inclement weather and degradation. The size of the enclosed frame perimeter structure 22 may vary, but will generally be large enough to house three wheels 30 and have enough of an interior area to allow a sled to pass interior of the enclosed frame perimeter structure 22, as is discussed further herein.

The angle block frame 20 may include an openable section 24 within the enclosed frame perimeter structure 22. This openable section 24 may be used to allow access to the wheels 30 mounted interior of the enclosed frame perimeter structure 22. The openable section 24 may include a full side of the enclosed frame perimeter structure 22, a portion of a side of the enclosed frame perimeter structure 22, or any combination of multiple sides of the enclosed frame perimeter structure 22. As is shown in FIG. 1, the openable section 24 is a side of the enclosed frame perimeter structure 22 which has movable joints 26 positioned at the junctions of the openable section 24 and the rest of the enclosed frame perimeter structure 22. The movable joints 26 may allow for movement of the openable section 24, such as a rotational movement or full displacement of the openable section 24. For example, one movable joint 26 may be fully released while another movable joint 26 is rotatable, thereby allowing the openable section 24 to pivot and allow access to the wheels 30. Other designs and configurations for an openable section 24 may also be included with the system 10, all of which are considered within the scope of the present disclosure.

Any number of wheels 30 may be included with the apparatus 10, the number of which may depend on the design of the overhead transmission and distribution system. For example, commonly a plurality of wheels 30, such as three, is used to allow for installation and retention of a plurality of cables. However, additional wheels 30 may be included with the apparatus 10 to provide convenient expansion of an overhead transmission and distribution system. The wheels 30 are connected to the angle block frame 20 in a substantially stationary position with respect to the angle block frame 20. The wheels 30 are rotatable about an axis which may be axially aligned with an axle, shaft, or other structure capable of supporting the wheels 30 and any forces applied thereto. For example, the wheels 30 may be rotatably positioned on a metallic axle which is connected to two different sides of the angle block frame 20, as is shown in FIG. 1. This orientation positions the wheels 30 within the interior area of the enclosed frame perimeter structure 22, whereby allowing the wheels 30 to rotate with a contacting cable.

The angular orientation of the wheels 30 and the axis on which they rotate may be selected based on design of the overhead transmission and distribution system. For example, commonly, the apparatus 10 is used for overhead transmission and distribution lines that are situated at an angle. This is seen when the lines are strung along a curved or bent path, such that the line path on one side of the utility pole 12 is not axially aligned with the line path on an opposing side of the utility pole 12. In these situations, the cable being strung between the utility poles 12 may exert a gravitational force and an angular force on the apparatus 10. Orienting the wheels 30 of the apparatus 10 angularly may allow for proper installation and retention of the cable.

With reference to FIG. 1, the orientation of the wheels 30 may include positioning the axis of the wheels 30 at an angle with respect to an elongated axis of the support bracket 14. In other words, the axis of the wheels 30 may intersect the elongated axis of the support bracket 14 at an angle greater than 0° but less than 90°. The specific angle of orientation may vary with design of the apparatus 10, however angles between 20° and 70° may be allowable, and angles of approximately 45° may be more preferable. Of course, angular orientation of the wheels 30 may be selected based on other structures besides the support bracket 14. For example, the axis of the wheels 30 may be selected based on a horizontal ground surface, the elongated axis of the utility pole 12, the angle between two or more utility poles 12, and/or the angle between two or more transmission and distribution lines. All variations not explicitly discussed herein are considered within the scope of the present disclosure.

At least one connector 40 is affixed to the angle block frame 20. The connector 40 may be used to securely fasten or affix the angle block frame 20 to a holding or supporting structure, such as the support bracket 14 of the utility pole 12. However, the connector 40 can be used to affix the angle block frame 20 to any other structure as well. The connector 40 may use any type of fastener or structure for engagement with a fastener. For example, the connector 40 may have a plurality of holes that a threaded fastener is inserted through. The threaded fastener may then be threaded into the support bracket 14, or otherwise engaged with a holding structure on the support bracket 14. As is shown in FIG. 1, two or more connectors 40 may be used with a single angle block frame 20. For example, one connector 40 may be used on one side of the angle block frame 20 and a second connector 40 on a different side of the angle block frame 20. This may allow for universal use and installation of the apparatus 10 with a variety of transmission and distribution line designs. In other words, the use of a plurality of connectors 40 on one angle block frame 20 may allow that angle block frame 20 to be used for both left-hand and right-hand angles in a transmission and distribution line about a utility pole 12.

Figure 2:
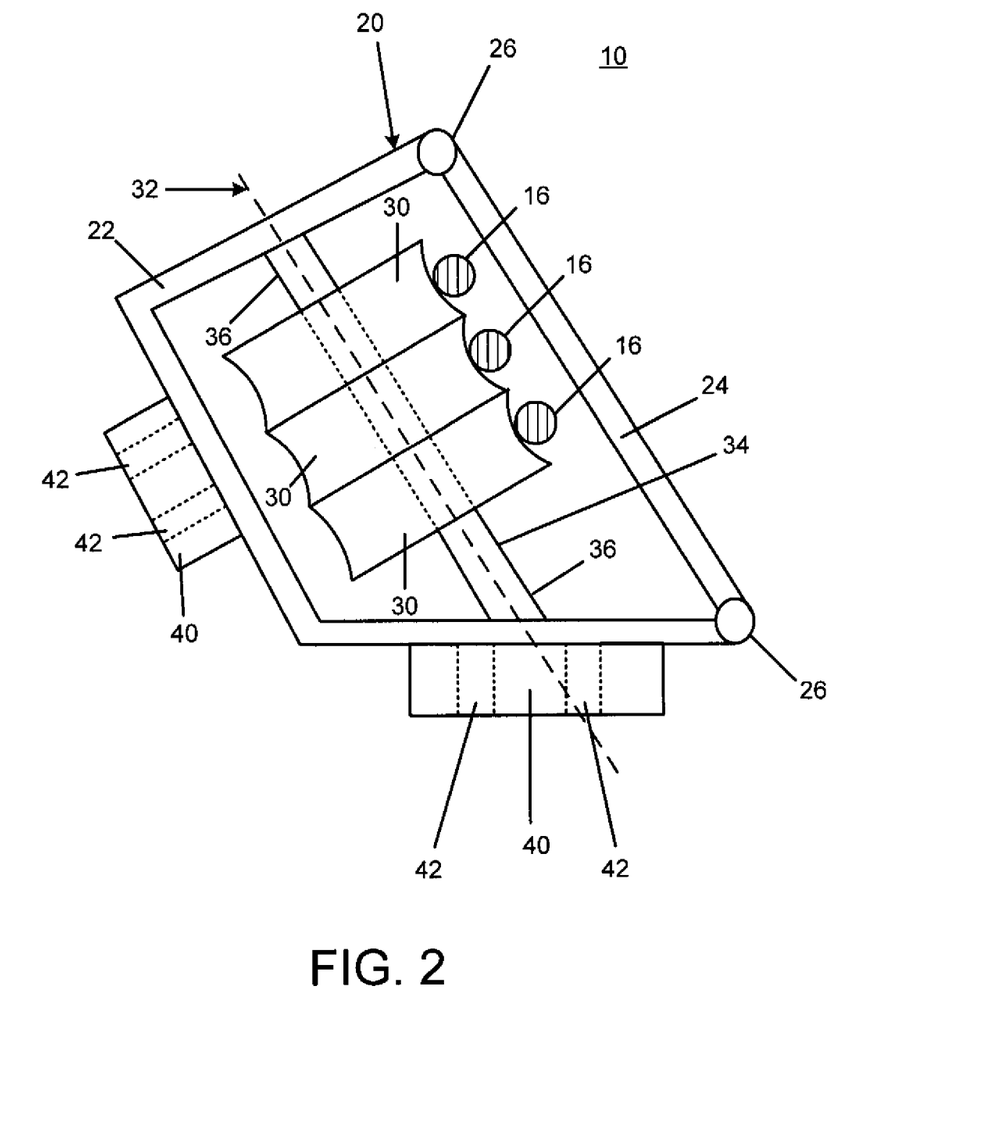
FIG. 2 is a partial cross-sectional front view illustration of the angle block apparatus, in accordance with the first exemplary embodiment of the present disclosure.

FIG. 2 is a partial cross-sectional front view illustration of the angle block apparatus 10, in accordance with the first exemplary embodiment of the present disclosure. The apparatus 10 is shown in use with a cross-sectional view of a plurality of cables 16, each of which is nested in a wheel 30. As the cables 16 contact the wheel 30, each of the wheels 30 may rotate about an axis 32. The axis 32 may be axially aligned with an axle 34 or other shaft member that is capable of supporting the wheels 30. The axle 34 may have end portions 36 which connect the axle 34 to the angle block frame 20. The end portions 36 may be angled or bent to allow for proper alignment and positioning of the wheels 30 within the enclosed frame perimeter structure 22.

The connectors 40 are shown in greater detail in FIG. 2, with one connector 40 positioned on one side of the enclosed frame perimeter structure 22 and a second connector 40 positioned on an adjacent side of the enclosed frame perimeter structure 22. It may be preferable to position a connector 40 on a portion of the enclosed frame perimeter structure 22 that is not an openable section 24, or not too proximate to a movable joint 26, as interference by the connector 40 with the openable section 24 or movable joint 26 may be desirable. The connectors 40 may have fastening structures 42 therein, such as threaded or non-threaded holes facilitating a threaded fastener. For example, with reference to FIG. 2, when one of the connectors 40 is used to affix the angle block frame 20 to a support bracket of a utility pole, the axis 32 and wheels 30 may be positioned in a first angle, and when the other connector 40 is used, the axis 32 and wheels 30 may be positioned in a second angle, where the first angle is substantially opposite the second angle. This configuration of connectors 40 allows for use of the apparatus 10 in situations where the cable 16 is strung at angles.

Figure 3:
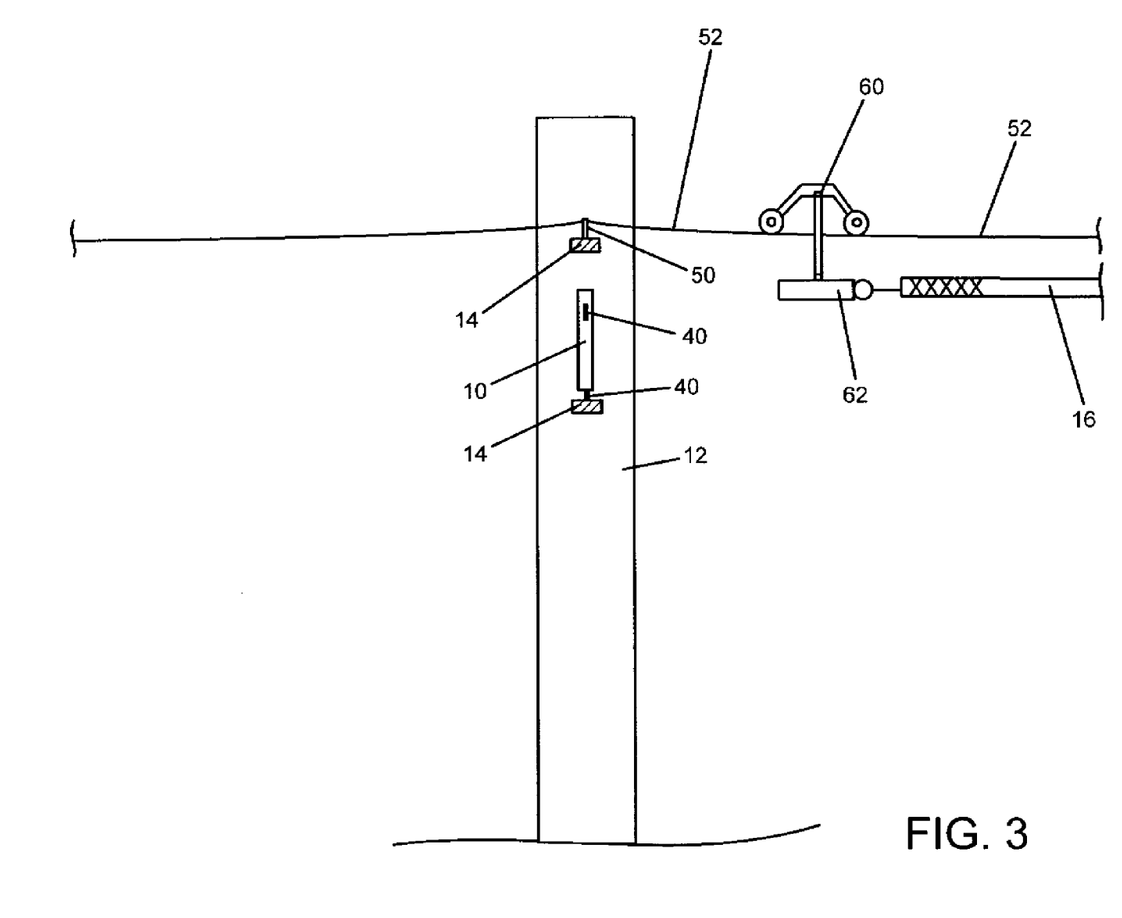
FIGS. 3-5 are side view illustrations of the angle block apparatus in use with a cable stringing processes, in accordance with the first exemplary embodiment of the present disclosure.
Figure 4:
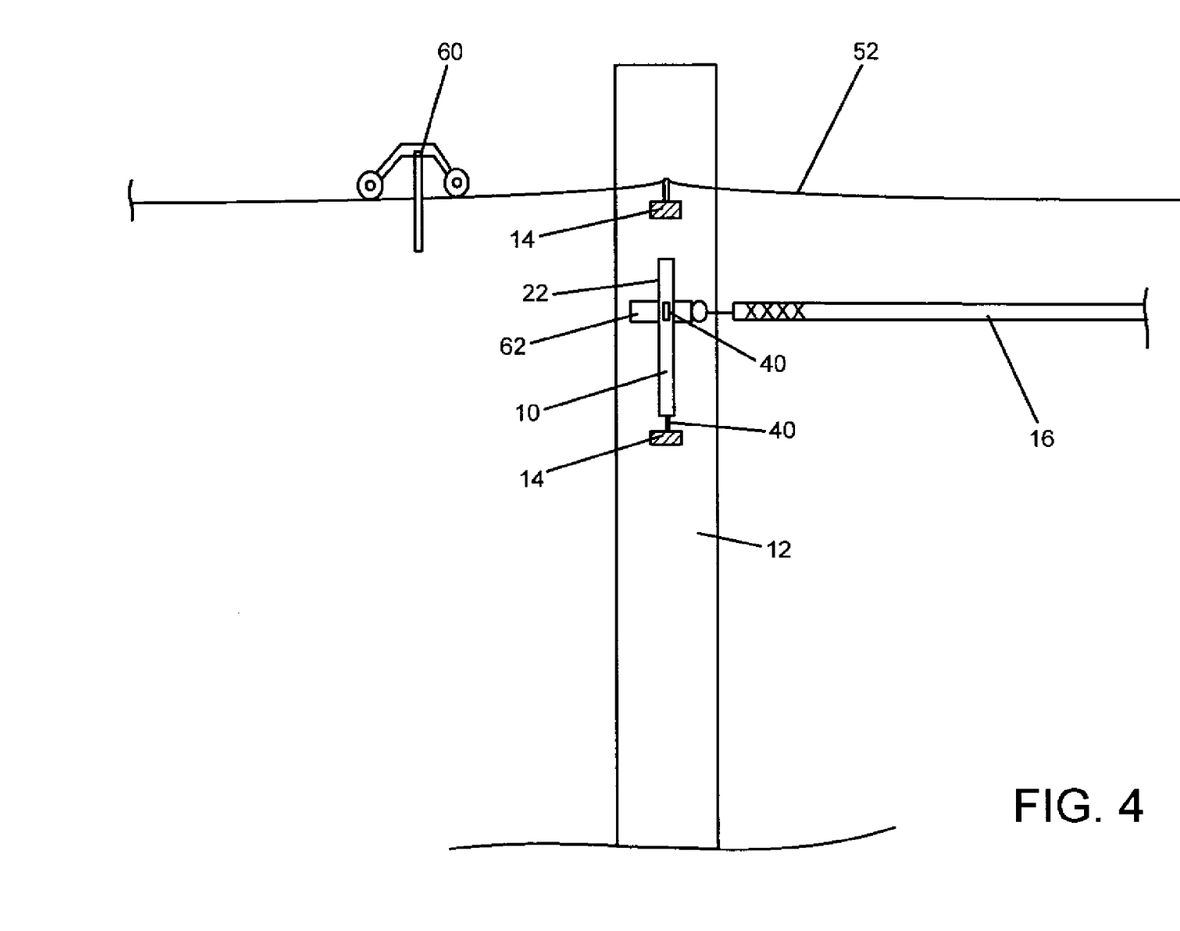
Figure 5:
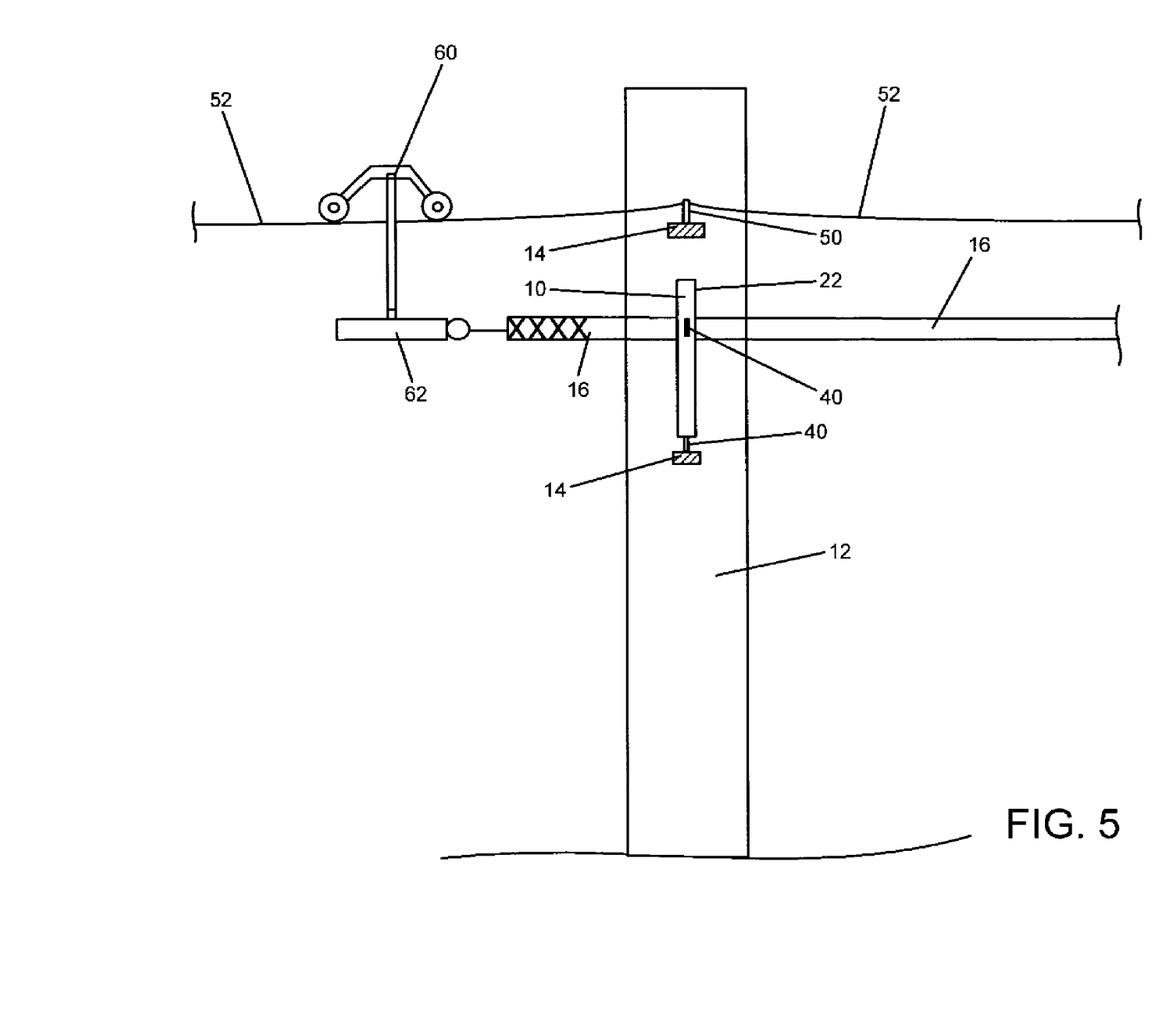

FIGS. 3-5 are side view illustrations of the angle block apparatus 10 in use with a cable stringing processes, in accordance with the first exemplary embodiment of the present disclosure. With reference to FIG. 3 first, the apparatus 10 is mounted via the connector 40 on a support bracket 14 of the utility pole 12. A messenger wire block 50 may be mounted on a support bracket 14 positioned above the apparatus 10. The messenger wire block 50 may support a messenger wire 52 which is used to carry a messenger wire trolley 60. Suspended and removably attached to the messenger wire trolley 60 is a sled 62 which is used to string the cable 16 through the apparatus 10. One end of the cable 16 may be affixed to the sled 62, which is then moved along the messenger wire 52 with the messenger wire trolley 60.

With reference to FIGS. 3-4, after the end of the cable 16 is affixed to the sled 62, the messenger wire trolley 60 with sled 62 attached may be moved along the messenger wire 52. As the sled 62 and cable 16 approach the apparatus 10, the sled 62 with cables 16 attached thereto may be disconnected from the messenger wire trolley 60, as is shown in FIG. 4. However, the cables 16 may remain connected to the sled 62. The sled 62 may then be moved through the enclosed frame perimeter structure 22 of the apparatus 10, with the cables 16 following in tow. An openable section 24 (FIGS. 1-2) of the enclosed frame perimeter structure 22 should remain closed during installation of the cable 16 to prevent injury due to a broken cable 16, as the enclosed frame perimeter structure 22 may help harness a cable 16 under tension that experiences a break. As the sled 62 and cables 16 are moved through the enclosed frame perimeter structure 22, the cables 16 may contact the roller wheels (not shown), which guide the cables 16 through the enclosed frame perimeter structure 22. The messenger wire trolley 60 may be moved from one side of the apparatus 10 to the other to be in position for reattachment of the sled 62 for further stringing. FIG. 5 illustrates the sled 62 in a reattached position with the messenger wire trolley 60 on the other side of the apparatus 10. The messenger wire trolley 60 and sled 62 with cables 16 attached thereto may then be used to string the cables 16 further along the messenger wire 52, and through any additional number of apparatuses 10. During the installation process or thereafter, the openable section 24 (FIGS. 1-2) may be opened to allow the cables 16 to be removed from the angle block frame 20, so a permanent device can be installed.

As can be seen from FIGS. 3-5, the cable 16 is strung from a first side of the apparatus 10 to a second side of the apparatus 10, i.e. from an entrance side of the apparatus 10 to an exit side of the apparatus 10. The sled 62 and cables 16 are moved through the enclosed frame perimeter structure 22 from the first side to second side, whereas the messenger wire trolley 60 is disconnected from the sled 62 and simply moved from the first side to the second side without moving through the enclosed frame perimeter structure 22. This allows the sled 62 and cables 16 to be conveniently and efficiently strung through the apparatus 10 and reattached to the messenger wire trolley 60 for further stringing. In use, this proves to be a highly efficient system and method of stringing cables 16 that saves a significant amount of installation time.

Many designs and variations to the apparatus 10 and methods associated with using the apparatus 10 may be available. For example, it may be preferable for the enclosed frame perimeter structure 22 to be sized large enough to have the sled 62 fit therethrough, but small enough to prevent unneeded manufacturing costs. Additionally, the connectors 40 used to affix the apparatus 10 to the support bracket 14 may be positioned on any part of the angle block frame 20 in any orientation, thereby allowing the apparatus 10 to be situated at a variety of angles. Commonly, the apparatus 10 may be used at a portion of a transmission and distribution system with a corner or other angle, such as at a street corner or other area where the cable 16 must be strung at an angle. Any other variations, designs, or features of the apparatus 10 not explicitly discussed herein are considered within the scope of the present disclosure.

Figure 6:
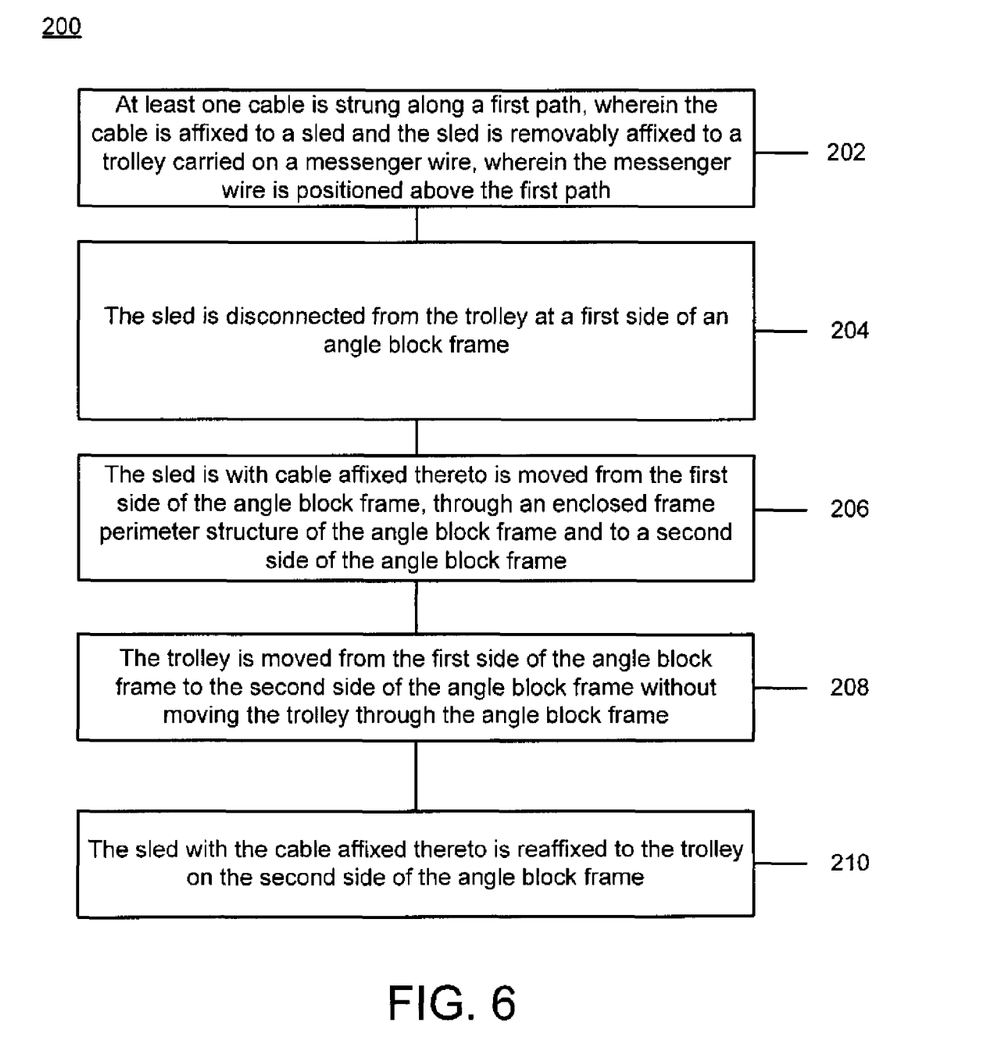
FIG. 6 is a flowchart illustrating a method of stringing cable through an angle block apparatus, in accordance with a second exemplary embodiment of the disclosure.

FIG. 6 is a flowchart 200 illustrating a method of stringing cable through an angle block apparatus, in accordance with a second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, at least one cable is strung along a first path, wherein the cable is affixed to a sled and the sled is removably affixed to a trolley carried on a messenger wire, wherein the messenger wire is positioned above the first path. The sled is disconnected from the trolley at a first side of an angle block frame (block 204). The sled with cable affixed thereto is moved from the first side of the angle block frame, through an enclosed frame perimeter structure of the angle block frame and to a second side of the angle block frame (block 206). The trolley is moved from the first side of the angle block frame to the second side of the angle block frame without moving the trolley through the angle block frame (block 208). The sled with the cable affixed thereto is reaffixed to the trolley on the second side of the angle block frame (block 210).

Any number of additional steps or variations thereof may be included with the method. For example, after the sled is moved through the enclosed frame perimeter structure, the sled with cable affixed thereto may be reaffixed to the trolley on the second side of the angle block frame. The second path may be oriented angularly with respect to the first path, such that the first path is not axially aligned or axially parallel with the second path. When the trolley is being moved, it may be removed from a first portion of the messenger wire on the first side of the angle block frame and reset on a second portion of the messenger wire on the second side of the angle block frame. The portion of the cable interior of the enclosed frame perimeter structure may contact the roller wheel positioned interior of the enclosed frame perimeter structure. Of course, the sled may have a plurality of cables affixed thereto, and all of the plurality of cables may be structure through the enclosed frame perimeter structure of the angle block frame.

As discussed previously, the angle block frame may be positioned angularly, such that an axis of the roller wheels angularly intersects a vertical axis, and/or a horizontal axis, such as the axis of a support bracket. The method may include positioning the angle block frame on a support bracket of a utility pole, wherein the angle block frame has at least one roller wheel connected to the angle block frame and positioned interior of an enclosed frame perimeter structure, wherein the at least one roller wheel is rotatable about an axis oriented angularly with respect to the support bracket. For example, the angle block frame may be oriented perpendicular to the support bracket, between an angle of 0° and 90° to the support bracket, or between an angle of 20° and 70° with respect to the support bracket, for example.

Figure 7:
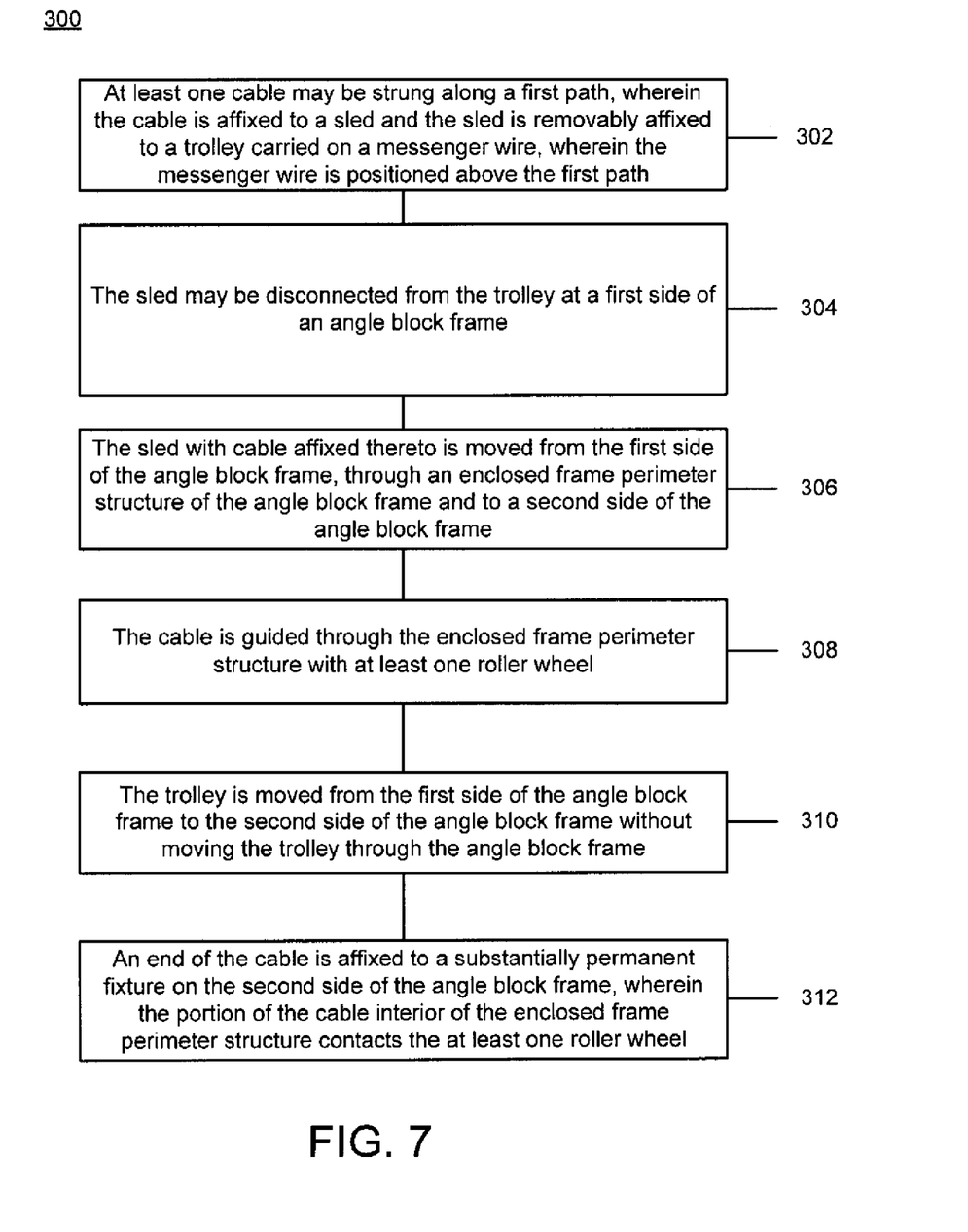
FIG. 7 is a flowchart illustrating a method of stringing and retaining cable on a utility pole, in accordance with a third exemplary embodiment of the disclosure.

FIG. 7 is a flowchart 300 illustrating a method of stringing and retaining cable on a utility pole, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, at least one cable may be strung along a first path, wherein the cable is affixed to a sled and the sled is removably affixed to a trolley carried on a messenger wire, wherein the messenger wire is positioned above the first path. The sled may be disconnected from the trolley at a first side of an angle block frame (block 304). The sled with cable affixed thereto is moved from the first side of the angle block frame, through an enclosed frame perimeter structure of the angle block frame and to a second side of the angle block frame (block 306). The cable is guided through the enclosed frame perimeter structure with at least one roller wheel (block 308). The trolley is moved from the first side of the angle block frame to the second side of the angle block frame without moving the trolley through the angle block frame (block 310). An end of the cable is affixed to a substantially permanent fixture on the second side of the angle block frame, wherein the portion of the cable interior of the enclosed frame perimeter structure contacts the at least one roller wheel (block 312).

Any number of additional steps or variations thereof may be included with the method. For example, the portion of the cable interior of the enclosed frame perimeter structure may be retained on the at least one roller wheel indefinitely, such as during an installation process or after an installation process. When the angle block frame is mounted on a support bracket of a utility pole, the axis of the roller wheel may be oriented at an angle with respect to the support bracket on which the angle block frame is mounted, such as at an angle between an angle of 20° and 70° with respect to the support bracket.

A use of the method of stringing and retaining cable on a utility pole may include stringing a cable or plurality of cables between a plurality of utility poles, where each utility pole may have at least one angle block frame. Accordingly, many steps of the method may be repeated. For example, prior to each utility pole and angle block frame, the sled is disconnected from the trolley at a first side of a second angle block frame. The sled with cable affixed thereto is moved from the first side of the second angle block frame, through an enclosed frame perimeter structure of the second angle block frame and to a second side of the second angle block frame. The cable is guided through the enclosed frame perimeter structure with at least one roller wheel. The trolley is then moved from the first side of the second angle block frame to the second side of the second angle block frame without moving the trolley through the second angle block frame. These steps, and any number of additional steps or variations thereof, may be repeated throughout the method.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An angle block apparatus for overhead transmission and distribution systems, the angle block apparatus comprising:
    an angle block frame having an enclosed frame perimeter structure;
    at least one roller wheel connected to the angle block frame and positioned interior of the enclosed frame perimeter structure, wherein the at least one roller wheel is rotatable about an axis; and
        at least a first connector affixed to a first side of the frame perimeter structure of the angle block frame and sized to retain the angle block frame in a substantially stationary position, the first side being disposed at a first angle relative to the roller wheel axis, the first angle being greater than zero degrees and less than 90 degrees; and
        a second connector affixed to a second side of the frame perimeter structure of the angle block frame and sized to retain the angle block frame in a substantially stationary position, wherein the first connector is independent of the second connector,
        wherein the second side is disposed at a second angle relative to the roller wheel axis, the second angle being greater than zero degrees, less than 90 degrees and different from the first angle.

2. The angle block apparatus of claim 1, wherein one of the first connector and the second connector connects the angle block frame in a substantially stationary position to a support bracket of a utility pole.

3. The angle block apparatus of claim 2, wherein the angle block frame is oriented in an angular position, wherein in the angular position, the axis of the at least one rotatable roller wheel intersects an elongated axis of the support bracket.

4. The angle block apparatus of claim 2, wherein the axis is oriented between an angle of 20° and 70° with respect to the support bracket.

5. The angle block apparatus of claim 1, wherein the enclosed frame perimeter structure is sized to prevent a cable stringing trolley from fitting therethrough.

6. The angle block apparatus of claim 1, wherein the angle block frame is positioned substantially directly below a messenger wire block.

7. The angle block apparatus of claim 1, further comprising an openable section within the enclosed frame perimeter structure.

8. The angle block apparatus of claim 1, wherein the first angle is 45 degrees.

9. An angle block apparatus for overhead transmission and distribution systems, the angle block apparatus comprising:
    an angle block frame having an enclosed frame perimeter structure;
    at least one roller wheel connected to the angle block frame and positioned interior of the enclosed frame perimeter structure, wherein the at least one roller wheel is rotatable about an axis;
    at least a first connector affixed to a first side of the frame perimeter structure of the angle block frame and sized to retain the angle block frame in a substantially stationary position, the first side being disposed at a first angle relative to the roller wheel axis, the first angle being greater than zero degrees and less than 90 degrees;
    a second connector affixed to a second side of the frame perimeter structure of the angle block frame and sized to retain the angle block frame in a substantially stationary position, wherein the first connector is independent of the second connector; and
    an openable section within the enclosed frame perimeter structure,
    wherein the openable section is joined to the enclosed frame perimeter structure with at least one movable joint.

10. The angle block apparatus of claim 9, wherein one of the first connector and the second connector connects the angle block frame in a substantially stationary position to a support bracket of a utility pole.

11. The angle block apparatus of claim 10, wherein the angle block frame is oriented in an angular position, wherein in the angular position, the axis of the at least one rotatable roller wheel intersects an elongated axis of the support bracket.

12. The angle block apparatus of claim 10, wherein the axis is oriented between an angle of 20° and 70° with respect to the support bracket.

13. The angle block apparatus of claim 9, wherein the enclosed frame perimeter structure is sized to prevent a cable stringing trolley from fitting therethrough.

14. The angle block apparatus of claim 9, wherein the angle block frame is positioned substantially directly below a messenger wire block.

15. An angle block apparatus for overhead transmission and distribution systems, the angle block apparatus comprising:
    an angle block frame having an enclosed frame perimeter structure;
    at least one roller wheel connected to the angle block frame and positioned interior of the enclosed frame perimeter structure, wherein the at least one roller wheel is rotatable about an axis;
    at least a first connector affixed to a first side of the frame perimeter structure of the angle block frame and sized to retain the angle block frame in a substantially stationary position, the first side being disposed at a first angle relative to the roller wheel axis, wherein the first angle is between 20 and 70 degrees:,
    a second connector affixed to a second side of the frame perimeter structure of the angle block frame and sized to retain the angle block frame in a substantially stationary position, wherein the first connector is independent of the second connector.

16. The angle block apparatus of claim 15, wherein one of the first connector and the second connector connects the angle block frame in a substantially stationary position to a support bracket of a utility pole.

17. The angle block apparatus of claim 16, wherein the angle block frame is oriented in an angular position, wherein in the angular position, the axis of the at least one rotatable roller wheel intersects an elongated axis of the support bracket.

18. The angle block apparatus of claim 16, wherein the axis is oriented between an angle of 20° and 70° with respect to the support bracket.

19. The angle block apparatus of claim 15, wherein the enclosed frame perimeter structure is sized to prevent a cable stringing trolley from fitting therethrough.

20. The angle block apparatus of claim 15, wherein the angle block frame is positioned substantially directly below a messenger wire block.

\* \* \* \* \*